Patented Feb. 13, 1923.

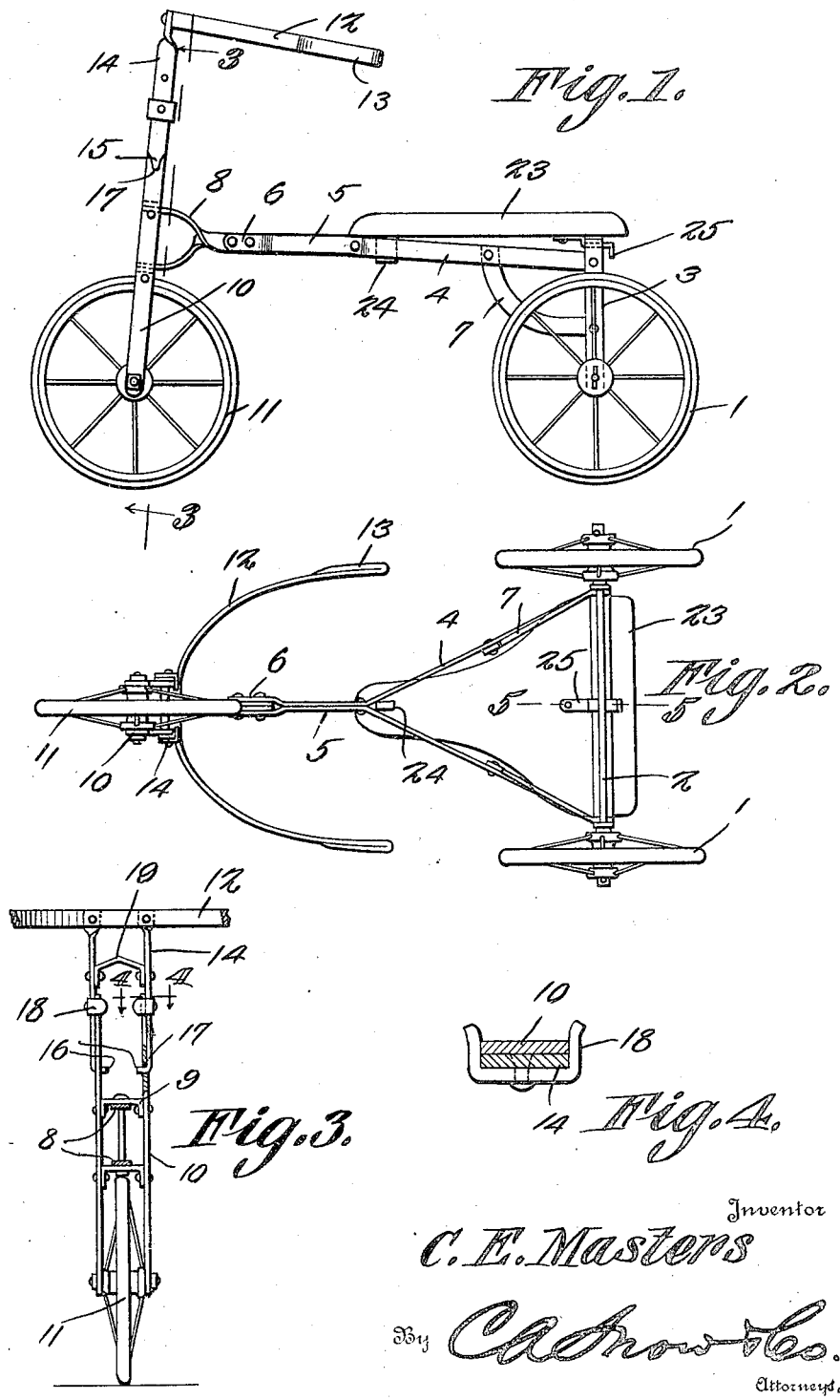

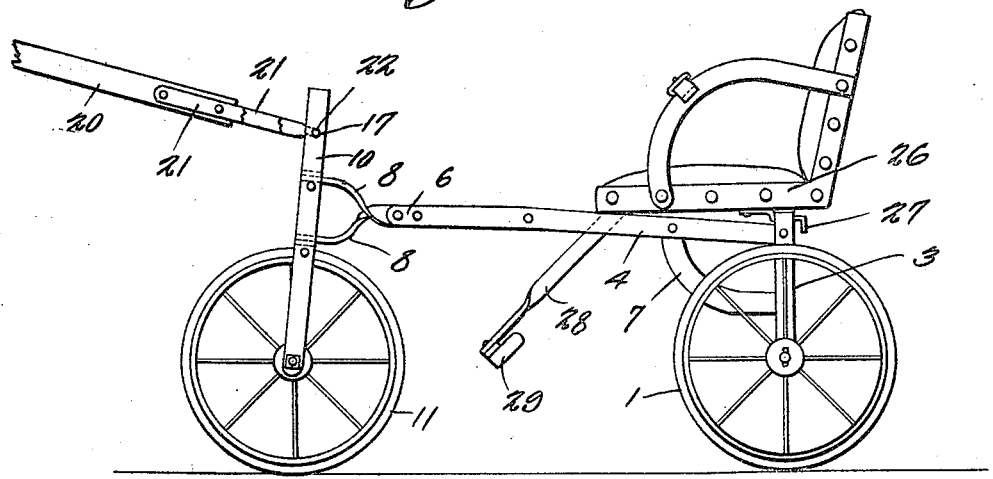

1,445,338

UNITED STATES PATENT OFFICE.

CHARLES EVERETT MASTERS, OF DES MOINES, IOWA.

CHILD'S VEHICLE.

Application filed February 8, 1922. Serial No. 534,967.

*To all whom it may concern:*

Be it known that I, CHARLES E. MASTERS, a citizen of the United States, residing at Des Moines, in the county of Polk and State of Iowa, have invented a new and useful Child's Vehicle, of which the following is a specification.

This invention relates to a child's vehicle, one of its objects being to provide a running gear utilizing three wheels and which may be provided with different kinds of bodies any one of which can be mounted thereon to provide an attractive vehicle for the purpose designed.

A further object is to provide simple and efficient means for attaching the body to the running gear.

Another object is to provide a head to which handle bars or a draft tongue can be connected, depending on the use to which the vehicle is to be put.

Another object is to provide a vehicle which is light but durable in construction and can be manufactured cheaply.

With the foregoing and other objects in view which will appear as the description proceeds, the invention resides in the combination and arrangement of parts and in the details of construction hereinafter described and claimed, it being understood, that, within the scope of what is claimed, changes in the precise embodiment of the invention shown can be made without departing from the spirit of the invention.

In the accompanying drawings the preferred forms of the invention have been shown.

In said drawings

Figure 1 is a side elevation of the vehicle with parts assembled for use as a coaster.

Figure 2 is a bottom plan view.

Figure 3 is a section on line 3—3, Figure 1.

Figure 4 is a section on line 4—4, Figure 3.

Figure 5 is a section on line 5—5, Figure 2.

Figure 6 is a side elevation showing the parts of the vehicle assembled for use as a one seated conveyance to be drawn or pulled.

Figure 7 is a side elevation of another modification utilizing a box body and a seat.

Referring to the figures by characters of reference 1 designates the rear supporting wheels engaging the ends of an axle 2 which is journaled in the sides of an upstanding yoke 3. Extending forwardly from the sides of the yoke are converging strips 4 the front portions of which are fastened together to provide a tongue 5 the front end of which is forked as shown at 6. The converging portions of the strip 4 constitute a body supporting frame and are connected to the sides of the yoke 3 by braces 7.

Secured in the fork 6 are separate strips 8 which are twisted so that their forward terminals are superposed and have their broad faces in parallel planes. The free ends of these strips 8 extend between cross strips 9 connecting the side strips 10 of the steering head of the vehicle. A front wheel 11 is journaled between the side strips 10 as shown.

If the steering head is to be turned by means of handle bars, a structure such as shown in Figures 1, 2 and 3 is used. This structure includes a bowed strip 12 having terminal handles 13, the middle portion of the strip being attached to depending parallel arms 14 the free ends of which are reduced as shown at 15 and inturned to provide studs 16. These studs are insertible through openings 17 in the side strips 10 and secured to each of the arms 14 is a yoke 18 adapted to straddle the upper portion of one of the side strips 10. See Figure 4. As shown in Figure 3 the arms 14 can be connected by a cross brace 19.

Instead of operating the steering head by means of handle bars the lugs 16 can be sprung out of the openings 17 and the arms 14 removed. A draft tongue 20 having parallel strips 21 extending rearwardly therefrom can be provided, these strips being inserted between the side strips 10 as shown in Figure 6 so that lugs 22 on the strips 21 can be projected outwardly into the openings 17.

As before stated different kinds of bodies may be mounted on the running gear. If the vehicle is to be used for coasting, the body may be in the form of a suitably shaped board 23 as shown in Figures 1 and 2. The broad rear end of the board rests on the yoke 3 while the front end rests on the strips 4. A centering lug 24 can be extended downwardly from the front portion of the board and between the converging strips 4 while a latch 25 can be pivotally connected to the bottom of the board so as to swing under the yoke 3 and hold the board in position thereon.

Instead of the board 23 a suitably constructed seat 26 can be mounted on the running gear, this seat being provided with a latch 27 similar to the latch 25. A hanger 28 can be extended downwardly from the seat and below the strips 4 and supports a foot rest 29.

Another modified construction shown in Figure 7 utilizes a box body 30 held in place by a latch 31. If desired a seat 32 similar to seat 26 can be mounted on this body.

As shown in Figure 5 the board 23 has a recess 33 into which a stud 34 is adapted to project, this stud being extended upwardly from the yoke 3. Thus displacement of the body relative to the yoke is prevented. The same arrangement is to be employed in connection with all types of bodies.

What is claimed is:—

1. The combination with the running gear of a vehicle including a wheel supported yoke, a steering head, and connected strips secured to the yoke and steering head, of a body mounted on the yoke and strips, holding means projecting from the yoke and seated in the body, and a latch for securing the body upon the yoke and in engagement with the holding means.

2. The combination with a wheel supported yoke and a wheel supported steering head, of forwardly extending strips connected to the yoke and steering head, an upstanding projection on the yoke, a body resting on the strips and yoke and engaging the projection and a latch for fastening the body on the yoke.

3. The combination with a wheel supported yoke and a wheel supported steering head, of means detachably engaging the steering head for turning the same, a structure fixedly connected to the yoke and pivotally engaged by the steering head, an upstanding projection on said structure, a body having a recess for the reception of said projection, said structure constituting a support for the body, and a latch for securing the body on the yoke.

4. The combination with a wheel supported yoke, a wheel supported steering head, and detachable means for turning the steering head, of a structure fixedly connected to the yoke and pivotally engaged by the steering head, a body mounted on the yoke and structure, a projection on the yoke for engagement with the body to hold it against lateral displacement, means for fastening the body upon the yoke, and means projecting from the forward portion of the body into the structure for centering said portion of the body upon the structure.

In testimony that I claim the foregoing as my own, I have hereto affixed my signature in the presence of two witnesses.

CHARLES EVERETT MASTERS.

Witnesses:
 C. H. BROCK,
 J. M. KEITHLEY.